April 30, 1957 R. S. ENABNIT 2,790,904

SAWTOOTH WAVEFORM GENERATOR

Filed June 24, 1954

*INVENTOR.*
ROBERT S. ENABNIT

*BY*

R. L. Miller
ATTORNEY 2,790,904

SAWTOOTH WAVEFORM GENERATOR

Robert S. Enabnit, Cuyahoga Falls, Ohio, assignor to The Goodyear Tire & Rubber Company, Akron, Ohio, a corporation of Ohio Application June 24, 1954, Serial No. 438,987

5 Claims. (Cl. 250—36)

This invention relates to a sawtooth waveform generator, and more particularly to an oscillator producing sawtooth waveforms.

Sawtooth oscillators produce a rise in voltage or current that is linear with respect to time followed by a rapid decrease to the original level; the time involved in the decrease of level being commonly referred to as the flyback or discharge time. The ideal sawtooth waveform would have a controllable and linear rise time with a zero flyback time. The rise time is usually obtained by the application of a potential to a resistor-capacitor combination; the current to the capacitor being limited by the resistor and resulting in a relatively slow rise in voltage across the capacitor; the limiting voltage being the voltage as applied to the combination. When the capacitor is fully charged the system is static and it is necessary to provide some method of discharging the capacitor rapidly. The repetition frequency of a resistor-capacitor type of sawtooth oscillator depends on the charging time constant of the resistor-capacitor combination, and the flyback time upon the ability to dissipate this charge.

At low frequencies serious limitations are involved. As the capacitance of the capacitor is increased to lengthen the rise time, the amount of stored energy which must be released during the discharge time is relatively large. Since the discharge time is generally required to be a short time-interval, high currents are involved which must be carried by discharge devices such as discharge tubes. The latter also have some resistance and the dicharge current may be further limited resulting in lengthened flyback time and poor waveform characteristics at high frequencies. For extended charging periods, the internal leakage of the capacitor must be low to allow the voltage to build up to a maximum value; a factor which indirectly increases the physical dimensions of the capacitor.

The general object of this invention is to provide a sawtooth waveform generator capable of producing very low frequency waveforms.

Another object of this invention is to provide a sawtooth waveform generator that is stable in operation, possesses good linearity, and produces a waveform with a short discharge or flyback time characteristic.

Yet another object of this invention is to provide a sawtooth generator possessing a low output impedance which is advantageous from the standpoint of coupling the generator into other circuits.

Still another object of this invention is to provide a sawtooth generator utilizing practical, easily available components arranged in a simple, economical, and efficient circuit.

The aforesaid objects of the invention, and other objects which will become apparent as the description proceeds, are achieved by an application of the principle of secondary emission. A multi-electrode or multi-grid electron discharge device such as a thermionic vacuum tube of the tetrode or pentode type is utilized with associated circuitry to emit electrons in such numbers from the cathode that a portion of the electrons will penetrate through the auxiliary grids and impinge on the anode or plate, thereby initiating secondary emission of electrons from the plate. The secondary emission effect gives rise to a plate electron current thus biasing the control-electrode or control-grid to exaggerate the condition. This bias potential is developed across a control-grid condenser until the negative bias potential produced by the total vacuum tube current through a cathode resistor is equalized. Further continuing increase in tube current results in a control-grid current flow which initiates the discharging of the control-grid condenser. The resulting waveform from an output connected to the cathode is a sawtooth waveform. Linearization of the waveform is effected through the characteristics of the screen-grid current flow and the secondary emission current flow while passing through the cathode resistor.

Figure 1:
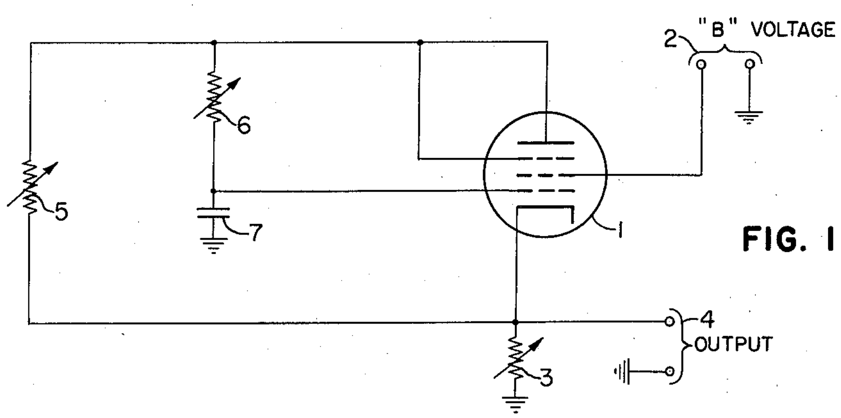
Fig. 1 is a schematic of the circuitry of the invention.

In Fig. 1 a single electron discharge device embodying five internal elements, such as a pentode thermionic vacuum tube 1 of the 6AG7 type is utilized. In the preferred embodiment described herein a 6AG7 pentode is used although any tetrode or pentode tube may be also used that exhibits the desired characteristics. The second electrode or screen-grid is connected to the positive side of a source of "B" voltage 2; the negative side of the source 2 being grounded. The cathode is connected to ground through a variable cathode resistor 3 and also to one of the output terminals 4. The anode or plate is connected to the cathode through a variable resistor 5 and also to the third electrode or suppressor-grid. The first electrode or control-grid is connected to the plate through a variable control-grid resistor 6 and to ground through a control-grid capacitor 7.

In operation, a relatively high electron current flows from the cathode to the screen-grid, originating from the grounded side of the resistor 3 and passing through the resistor 3. Some of the electrons emitted from the cathode pass through the screen-grid mesh and by striking the plate and suppressor-grid give rise to a secondary emission of electrons from the plate and suppressor-grid, which electrons are in turn attracted to the screen-grid adding to the screen-grid current. The plate and suppressor-grid potential thus becomes positive with respect to the cathode and an electron current flows to the plate and suppressor-grid in the circuit from the cathode through the resistor 5.

Since the circuit including the resistor 6 and the condenser 7 is connected in parallel with the plate circuit containing the two resistors 3 and 5, the plate side of the resistor 6 is at a positive potential with respect to ground and thus the condenser 7 begins to charge. The control-grid, being connected between the condenser 7 and the resistor 6, is negative with respect to the cathode. As the condenser 7 charges, the control-grid becomes less negative with respect to the cathode and the screen-grid current and the secondary emission effect are increased. When the control-grid has reached a zero potential with respect to the cathode and begins to swing positive, the screen-grid current and the secondary emission effect begin to decrease rapidly and a control-grid current begins to flow, thus discharging the condenser 7. After the condenser 7 is sufficiently discharged, the control-grid again swings negative with respect to the cathode and regains control in the tube 1. The condenser 7 then begins to charge anew and the cycle repeats itself. Since the incremental voltage applied to the circuit embodying the resistor 6 and the condenser 7 is relatively small at any particular instant, the charging current to the condenser 7 is limited to a low value and appreciable time must elapse for the condenser 7 to reach the fully charged condition.

Figure 2:
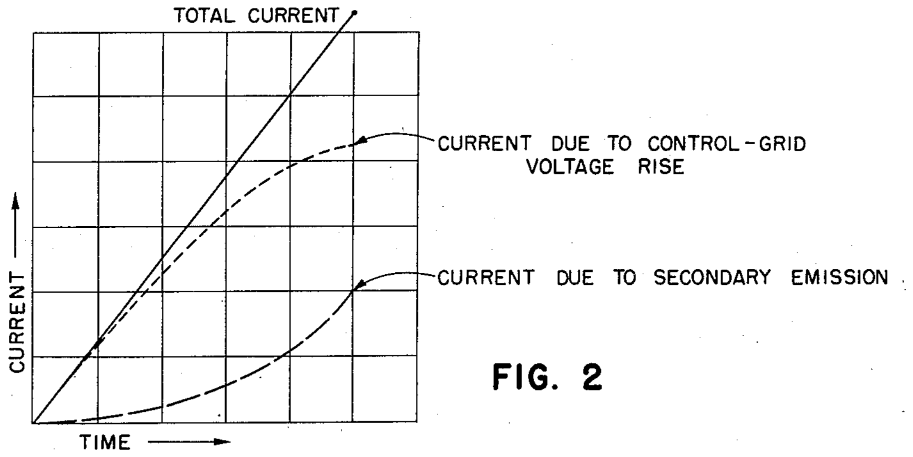
Fig. 2 is a graphical analysis of the current flow through the cathode resistor.

In Fig. 2, an analysis of the current flow through the resistor 3 is shown. The current due to the secondary emission effect increases approximately exponentially with time. The current in the screen-grid, due to the control-grid voltage change, also increases approximately exponentially with time, but in such relation to that part of the current due to the secondary emission effect that the total current through the resistor 3 is substantially linear. Since the current due to the secondary emission effect produces a voltage across the resistor 5 which rises sharply in proportion to the secondary emission current, whereas the cathode potential rises at an almost linear rate, a point is eventually reached where the control-grid is positive in potential with respect to the cathode and the control-grid draws current. Due to the space charge surrounding the cathode, the control-grid voltage actually swings slightly negative. When this occurs, the screen-grid current and the secondary emission effect begin to decrease, but the secondary emission current now falls off more rapidly than the screen-grid current, with the net result that the cathode and plate potentials decrease rapidly until the secondary emission effect ceases and the condenser 7 is discharged through the control-grid until again the control-grid regains control.

Figure 3:
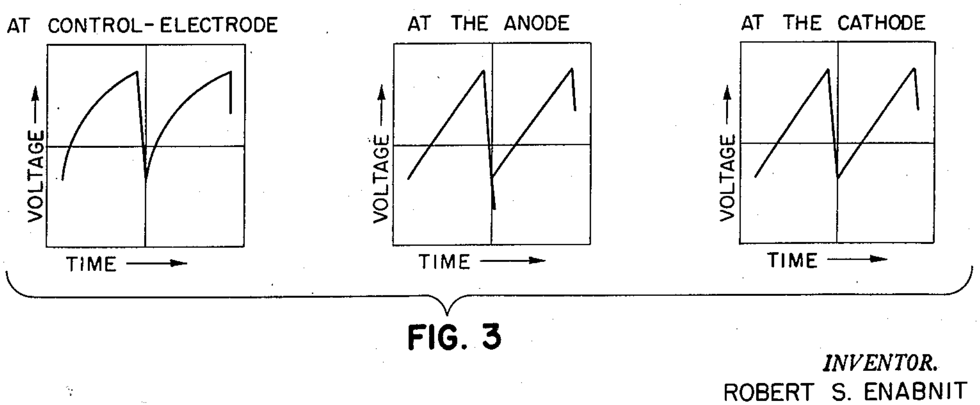
Fig. 3 is a graphical representation of the waveforms obtained in the invention.

Fig. 3 shows the typical waveforms obtained at the locations indicated thereon. The waveform at the control-electrode exhibits the non-linear characteristics of the capacitor charging potential. In the waveform at the anode, the effect of the secondary emission can be noted in the downward extension of the return portion of the waveform. The waveform at the cathode is the output waveform and possesses the desired linearity of rise.

Frequency range is controlled by delaying the rise in the control-grid voltage by means of the resistor 6 or the condenser 7. The resistor 5 is sized so as to provide the maximum possible voltage rise due to secondary emission which is permissible to sustain oscillation and without reducing the current to such an extent as to destroy cathode linearization.

A frequency range from 3 cycles per minute to 5000 cycles per second was obtained with the following component values: resistor 3 at 500–5000 ohms, resistor 5 at 250,000 ohms, resistor 6 at 1 megohm, and condenser 7 at .05 microfarad. The output potential was approximately 30–40 volts. A top frequency of 10,000 cycles per second, above which oscillation could not be maintained, was obtained by varying the resistor 6. A low frequency of 1 cycle per minute was obtained with a value of 0.25 microfarad for the condenser 7. Even lower frequencies may be obtained with a proportionate increase in the capacity of the condenser 7. The linearity of the rise in the output voltage does not change with the sawtooth frequency to any determined extent and the effect of the frequency on the amplitude is relatively small.

The condenser 7 may be omitted completely from the circuit being replaced in function by the internal capacity of the vacuum tube 1. With a 1 megohm control-grid resistor 6, the lower frequency limit is approximately 2 cycles per second in this case.

Experimentally, the frequency rate does not appear to be a direct function of the value of the condenser 7 in the time-constant circuit. This is probably due to the charging increment varying as the value of the condenser 7 and the secondary emission rise time are changed.

While certain representative embodiments and details have been shown for the purpose of illustrating the invention, it will be apparent to those skilled in this art that various changes and modifications may be made therein without departing from the spirit or scope of the invention.

I claim:

1. An oscillator circuit for producing sawtooth waveforms comprising an electron discharge device having, at least, in the order named, a cathode, a first electrode, a second electrode, and an anode; means for energizing the discharge device to cause electron current to flow from the cathode to the second electrode and to cause secondary emission of electrons at the anode; a first circuit, including a variable resistor, coupling the anode to the cathode; a second circuit, including a variable resistor, coupling the anode to the first electrode; and a third circuit, including a capacitor, coupling the first electrode to the cathode, the secondary emission at the anode resulting in a potential difference across the capacitor to charge the capacitor and simultaneously change the bias relationship between the first electrode and the cathode until the bias is sufficient to cause current to flow through the first electrode thereby discharging the capacitor, said charging and discharging of the capacitor being periodic and regular and resulting in sawtooth waveforms in the cathode circuit.

2. An oscillator circuit for producing sawtooth waveforms comprising an electron discharge device having, at least, in the order named, a cathode, a first electrode, a second electrode, and an anode, a source of energizing potential coupled to the discharge device to cause electron current to flow from the cathode to the second electrode and said potential sufficient in level to cause secondary emission of electrons at the anode, a first variable resistor series-connected between the anode and cathode, a second variable resistor series-connected between the anode and the first electrode, and a capacitor coupled between the first electrode and the cathode, the secondary emission effect at the anode creating a potential difference across the capacitor to charge the capacitor and simultaneously change the bias relationship between the first electrode and the cathode until the bias is sufficient to cause current flow through the first electrode to discharge the capacitor, said charging and discharging of the capacitor being periodic and regular and resulting in sawtooth waveforms in the cathode circuit.

3. An oscillator circuit for producing sawtooth waveforms comprising an electron discharge device having, at least, in the order named, a cathode, a first electrode, a second electrode, and an anode, a source of energizing potential coupled to the discharge device to cause electron current to flow from the cathode to the second electrode and said potential sufficient in level to cause secondary emission of electrons at the anode, a first variable resistor series-connected between the anode and cathode, a second variable resistor series-connected between the anode and the first electrode, a third variable resistor included in the cathode side of the discharge device energizing potential circuit, and a capacitor coupled between the first electrode and the cathode side of the discharge device energizing potential circuit, the secondary emission effect at the anode resulting in a potential difference across the capacitor to charge the capacitor and simultaneously change the bias relationship between the first electrode and the cathode until the bias is sufficient to cause a current to flow through the first electrode to discharge the capacitor, said charging and discharging of the capacitor being periodic and regular and resulting in sawtooth waveforms in the cathode circuit.

4. An oscillator circuit for producing sawtooth waveforms comprising an electron discharge device having, at least, in the order named, a cathode, a first electrode, a second electrode, and an anode, a source of positive and negative direct-current electrical energy with the positive side connected to the second electrode, a first variable resistor series-connected between the anode and cathode, a second variable resistor series-connected between the anode and the first electrode, a third variable resistor series-connected between the cathode and the negative side of the electrical energy source, and a capacitor series-connected between the first electrode and the negative side of the electrical energy source, said electrical energy source being of sufficient potential level to cause secondary emission of electrons from the anode due to high electron current flow between the cathode and second electrode.

5. An oscillator circuit for producing sawtooth waveforms comprising an electron discharge device having, at least, in the order named, a cathode, a first electrode, a second electrode, and an anode, means for energizing the discharge device to cause electron current to flow from the cathode to the second electrode and to cause secondary emission of electrons at the anode, a capacitor, circuit means to couple said capacitor to the anode and the first electrode on one side thereof and to the cathode on the other side to charge the capacitor during said secondary emission from the anode and to thereby change the first electrode bias relative to the cathode until said bias is such that the capacitor is rapidly discharged, said sequence of charging and discharging the capacitor occurring periodically and regularly.

References Cited in the file of this patent

UNITED STATES PATENTS

| | | |
|---|---|---|
| 2,199,278 | Black | Apr. 30, 1940 |
| 2,213,855 | Black | Sept. 3, 1940 |
| 2,270,405 | Black | Jan. 20, 1942 |